Figure 1:
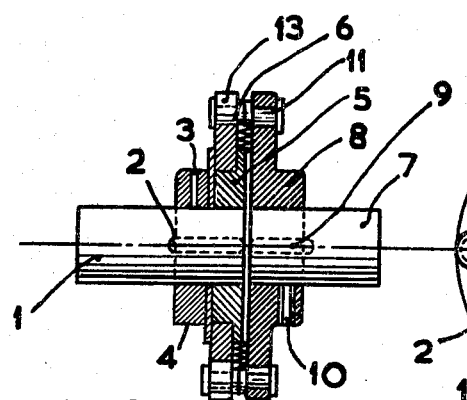

Oct. 17, 1961 — R. D. BUGEL — 3,004,411
ROTARY SLIP CLUTCH
Filed June 17, 1957 — 2 Sheets-Sheet 1

INVENTOR.
ROELOF DIRK BUGEL
BY
AGENT

Oct. 17, 1961 R. D. BUGEL 3,004,411
ROTARY SLIP CLUTCH
Filed June 17, 1957 2 Sheets-Sheet 2

INVENTOR.
ROELOF DIRK BUGEL
BY
Frank R. Trifari
AGENT 3,004,411
ROTARY SLIP CLUTCH
Roelof Dirk Bugel, Zwolle, Netherlands, assignor to North American Philips Company, Inc., New York, N.Y., a corporation of Delaware
Filed June 17, 1957, Ser. No. 666,082
Claims priority, application Netherlands June 27, 1956
3 Claims. (Cl. 64—29)

This invention relates to preferably adjustable, rotary slip clutches. Clutches of this type are known and may, for example, comprise two members which are made to engage each other at an adjustable pressure so that the driven member follows the driving member by friction. Such generally known clutches suffer from a disadvantage in that the driven end has a dropping characteristic, which is to be understood to mean that, if the driven portion is subjected to a torque exceeding the torque which the clutch is able to transmit without slipping, the clutch not only tends to slip, but the torque imparted also decreases. Sometimes, the latter is undesirable and it may be desired to transmit a greater torque with a slipping clutch, the latter naturally within given limits. If the load on the driven portion becomes excessively high, the clutch slips completely and the driven portion comes to a standstill.

The clutch according to the invention has a rising characteristic, which is to be understood to mean that the torque imparted increases with a higher load of the driven portion and with increasing slip. In this case, the speed of the driven portion is reduced on account of the slip and the driving mechanism is required to impart such a greater torque at a constant speed. According to the invention, such a slip clutch has the feature that at least one ring-shaped member of elastic material with a high internal friction is rigidly secured to either of the driven or driving portions, and the other portion comprises at least one rolling element, the outer periphery of which co-acts at a preferably adjustable pressure with one of the faces of the ring-shaped elastic member, the face opposite said face being supported. Such a clutch has indeed the desired rising characteristic. The elastic member may be made from natural rubber, synthetic rubber or other synthetic material such as, for example, the synthetic material commercially available as "Vulcollan". Of course, cold-flowing materials are unsuitable.

In one embodiment of the invention, the rolling element preferably co-acts with a side face of the ring-shaped elastic member. The foregoing affords a simple construction.

A preferred embodiment of the invention comprises one or more pairs of rolling elements situated pairwise opposite each other at both sides of the elastic member, the outer periphery of said rolling elements co-acting, preferably at an adjustable pressure, with the elastic member, and all the rolling elements at one side of this member being rotatably housed in a holder which is connected to a driven portion, while the rolling elements at the other side are rotatably housed in a holder which is only capable of axial movement relative to said portion and is axially loaded by a preferably adjustable spring.

Figure 2:
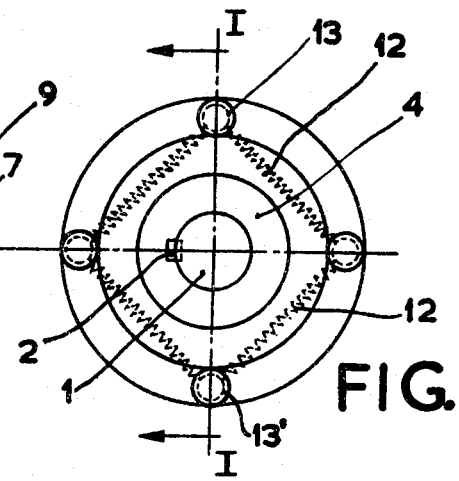
Figure 3:
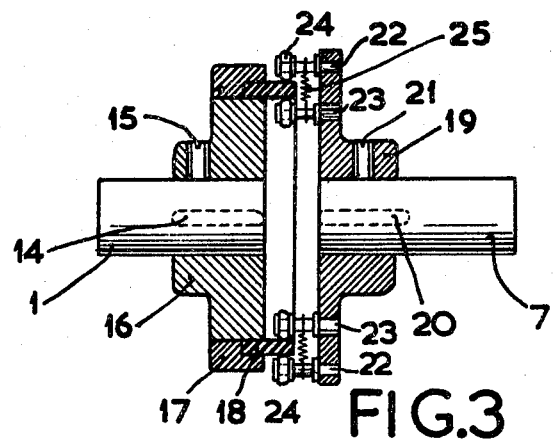
Figure 4:
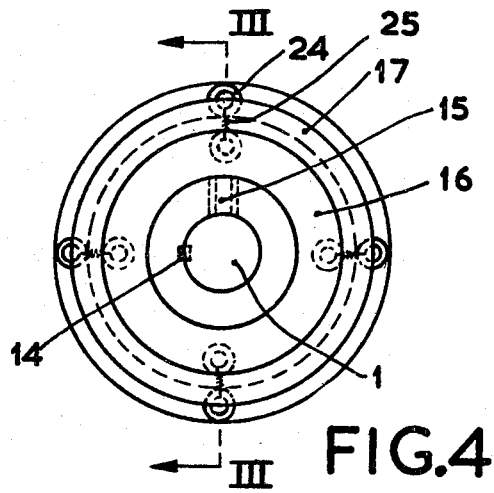
Figure 5:
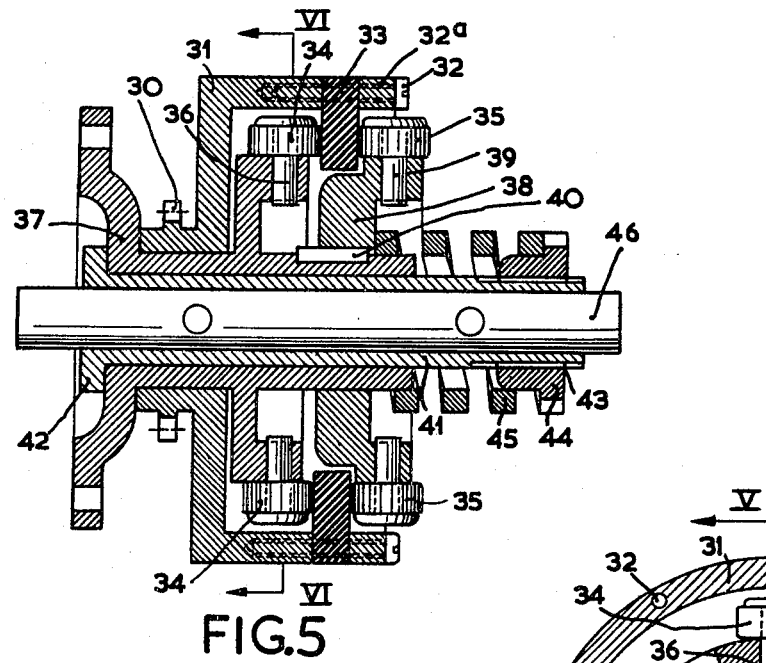
Figure 6:
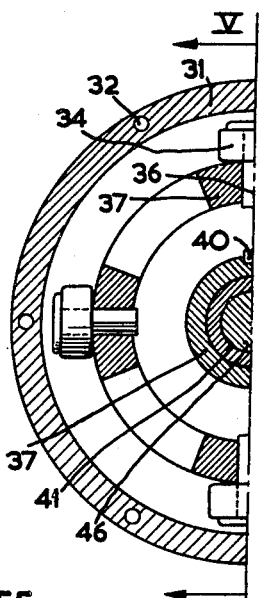
Figure 7:
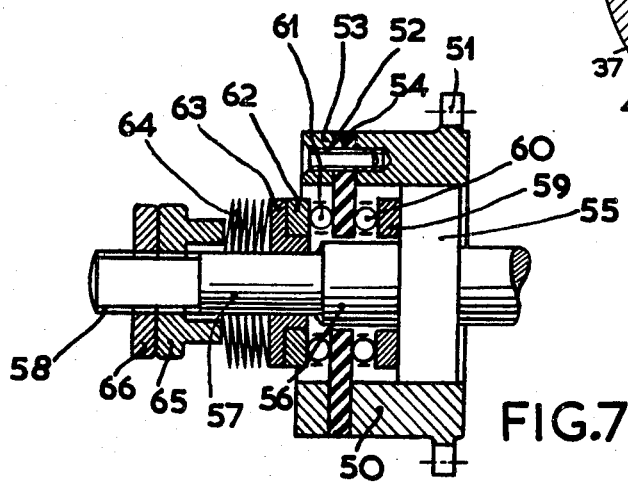

In order that the invention may be readily carried into effect, four examples will now be described in detail with reference to the accompanying drawing, in which FIG. 1 is a sectional view of a rotary slip clutch shown in FIG. 2, on the line I—I, viewed in the direction of the arrow, FIG. 2 is an elevation of the clutch shown in FIG. 1, FIG. 3 is a sectional view of the rotary slip clutch shown in FIG. 4 on the line III—III, viewed in the direction of the arrows, FIG. 4 is a front view of the clutch shown in FIG. 3, FIG. 5 is a sectional view on the line V—V, of the clutch shown in FIG. 6, again viewed in the direction of the arrows, FIG. 6 is a cross-sectional view of FIG. 5 on the line VI—VI, also viewed in the direction of the arrows, and FIG. 7 is a cross-sectional view of a form of a slip clutch comprising ball bearings.

In FIGS. 1 and 2, the reference numeral 1 designates a driving shaft having secured to it a flange 4 by means of a key 2 and a thrust screw 3. Secured between the flange 4 and another flange 5 is an intermediate member 3a thus forming a groove which is engaged by a rubber ring 6. Secured to a driven shaft 7 is a further flange 8 which is locked against rotation by means of a key 9, and locked in position by means of a thrust screw 10. This flange 8 comprises four pins 11 which are capable of a slight radial movement in slots. These pins 11 are connected together through helical springs 12 and each carry a roller 13 which is freely rotatable about the pin and the periphery of which co-acts with the outer periphery of the ring 6 of elastic material. The outer periphery of the rollers 13 is consequently biased into engagement with the outer periphery of the rubber ring 6. It is found that with an increase in load of the shaft 7 and at a constant speed of the shaft 1 a given slip occurs between these shafts, so that the rollers 13 move over the periphery of the rubber ring 6 and the torque transmitted to the shaft 7 increases. Of course, the shaft 7 will finally come to a standstill if it is loaded too heavily.

In FIGS. 3 and 4, the driving shaft is again designated by reference numeral 1 and the driven shaft by reference numeral 7. By means of a key 14 and a thrust screw 15 the shaft 1 has secured to it a flange 16 carrying a ring 17. Between this ring 17 and the flange 16 is clamped a rubber ring 18. By means of a key 20 and a thrust screw 21 the driven shaft 7 has secured to it a flange 19 comprising four pairs of pins 22—23. The pins 22 are rigidly connected to the flange 19 and the pins 23 are capable of a slight radial movement. Both pins carry rollers 24 which are rotatable about the pin and between each pair of pins is provided a spring 25 so that each pair of rollers is each time biased into engagement with the rubber ring 18. This clutch also has a rising characteristic.

FIGS. 5 and 6 show a gear wheel 30 which constitutes the driving part of the clutch and forms part of a member 31 to which a rubber ring 33 is secured by means of screws 32 and a clamping ring 32a. At both sides of this rubber ring there are four pairs of rollers each consisting of rollers 34 and 35. The rollers 34 are rotatable about pins 36 which are rigidly secured to a member 37 constituting the driven part of the clutch. A supporting member 38 provided with pins 39 about which the rollers 35 are rotatable is axially movable on the driven part 37 and locked against rotation by means of a key 40. A bushing 41 has a flange 42 at one end and a screw thread 43 at its other end. This screw thread co-acts with an adjustable cap nut 44 between which and the member 38 is provided a thrust spring 45. A shaft 46 carries the clutch.

The operation of the clutch is as follows: If the gear wheel 30 is impelled, the member 31 and the rubber ring 33 are taken along. The rollers 34 and 35 are pressed against the rubber ring 33 at both sides by the thrust spring 45 and carry along the driven part 37. The pressure exerted by the rollers on the rubber ring is adjustable by turning the cap nut 44, so that the maximum torque to be imparted by the driven part 37 is also adjustable. This clutch also has a rising characteristic.

Of course, the rings 6, 18 and 33 may be made from rubber, synthetic rubber or similar material which is elastic and has a high internal friction. Materials liable to cold flow are unsuitable.

Finally, FIG. 7 shows a simple construction of a clutch according to the invention, in which a driving part 50 carries a gear wheel 51. By means of screws 52 a ring 53 is secured to the driving part 50 and between this ring 53 and the member 50 is provided a rubber ring 54. The collar 55 of the driven shaft has a neck 56 and a neck 57, the latter being provided with a screw thread 58. The end of the shaft 55 carries a ball race 59 with a cage containing balls 60. At the other side of the rubber ring 54 is provided a similar cage containing balls 61 with a ball race 62 which rests in a thrust member 63. A simple resilient member made up of stacked plates of resilient metal, for example hard bronze, is denoted by 64 and the assembly is tightened by means of a cap nut 65 and a checknut 66. This assembly also constitutes a rotary slip clutch having a rising characteristic and the advantage that the expensive parts of the clutch consist of normal components for the greater part.

What is claimed is:

1. An adjustable rotary slip clutch comprising a driving portion, a driven portion, an elastic element having a high internal friction, means rigidly securing said elastic element to one of said portions, said driven portion being provided with at least one rolling member in engagement with one side of said elastic element, means mounting said rolling member for radial movement relative to said driving portion, means for adjusting the pressure of said rolling member on said elastic element, and means for supporting the other side of said elastic element.

2. An adjustable slip clutch as claimed in claim 1 wherein said elastic member is ring-shaped.

3. An adjustable rotary slip clutch comprising a driving portion, a driven portion, an elastic element having a high internal friction, means rigidly securing said elastic element to one of said portions, a pair of rollers each being positioned on opposite sides of said elastic element, the outer periphery of each of said rollers engaging said elastic element, means mounting one of said rollers on said driven portion, and means mounting said other roller on said driven portion adapted for radial movement relative to said driven portion including a spring urging said other element into engagement with the elastic element.

References Cited in the file of this patent

UNITED STATES PATENTS

| | | |
|---|---|---|
| 1,518,634 | Cason | Dec. 9, 1924 |
| 2,116,192 | Draminsky | May 3, 1938 |
| 2,683,362 | Bowman | July 13, 1954 |

FOREIGN PATENTS

| | | |
|---|---|---|
| 110,543 | Switzerland | June 16, 1923 |
| 834,481 | Germany | Mar. 20, 1952 |